US007007558B1

(12) United States Patent
Carpenter

(10) Patent No.: US 7,007,558 B1
(45) Date of Patent: Mar. 7, 2006

(54) PULSE TRANSMITTER

(75) Inventor: Frank Carpenter, Lake Charles, LA (US)

(73) Assignee: Lake Charles Instruments, Inc., Lake Charles, LA (US)

(*) Notice: Subject to any disclaimer, the term of this patent is extended or adjusted under 35 U.S.C. 154(b) by 0 days.

(21) Appl. No.: 10/448,737

(22) Filed: May 27, 2003

Related U.S. Application Data

(60) Provisional application No. 60/382,994, filed on May 24, 2002.

(51) Int. Cl.
G01F 15/06 (2006.01)
(52) U.S. Cl. .................................. 73/861.78
(58) Field of Classification Search ............ 73/861.78, 73/861.89; 475/154, 149, 217
See application file for complete search history.

(56) References Cited

U.S. PATENT DOCUMENTS

| | | | | |
|---|---|---|---|---|
| 3,731,533 A | * | 5/1973 | Geery | 73/861.78 |
| 4,598,594 A | * | 7/1986 | Painley | 73/861.78 |
| 5,956,626 A | | 9/1999 | Kaschke et al. | |
| 6,001,042 A | * | 12/1999 | Raney | 475/217 |
| 6,102,827 A | * | 8/2000 | Teasdale et al. | 475/154 |
| 6,392,370 B1 | | 5/2002 | Bedini | |

OTHER PUBLICATIONS

Parts List, Type "D" Transmitter, Flow Measurement & Control Division, Geosource Inc., Oct. 1963, (1 page).
Bulletin 1.6.2.5., Type "D" Transmitter, Smith Meter Systems Division, Geosource Inc., Nov. 1976, (4 pages).
Bulletin 1.6.2.5.1, Model PST, Pulse Security Transmitter, Specifications, A Moorco Company, Jun. 1983 (2 pages).
Parts List, Transmitter, Type "D", Form No. P0905.02, FMC Smith Meter Inc., May 1995, (2 pages).

* cited by examiner

Primary Examiner—Edward Lefkowitz
Assistant Examiner—Jewel V. Artis
(74) Attorney, Agent, or Firm—Garvey, Smith, Nehrbass & North, L.L.C.; Seth M. Nehrbass

(57) ABSTRACT

A pulse transmitter for fluid metering includes concentric gearing, with the exciter gear concentric with the main shaft in the center. Because of this concentricity, one can put practically any number of additional coils (typically four) to get four or more outputs. Also, each coil could be dual output to get eight outputs from four coils. Each coil preferably produces 1000 pulses per revolution of the main shaft. Because of its compactness and light weight, this pulse transmitter has a more practical application in the liquid metering industry than prior transmitters.

15 Claims, 1 Drawing Sheet

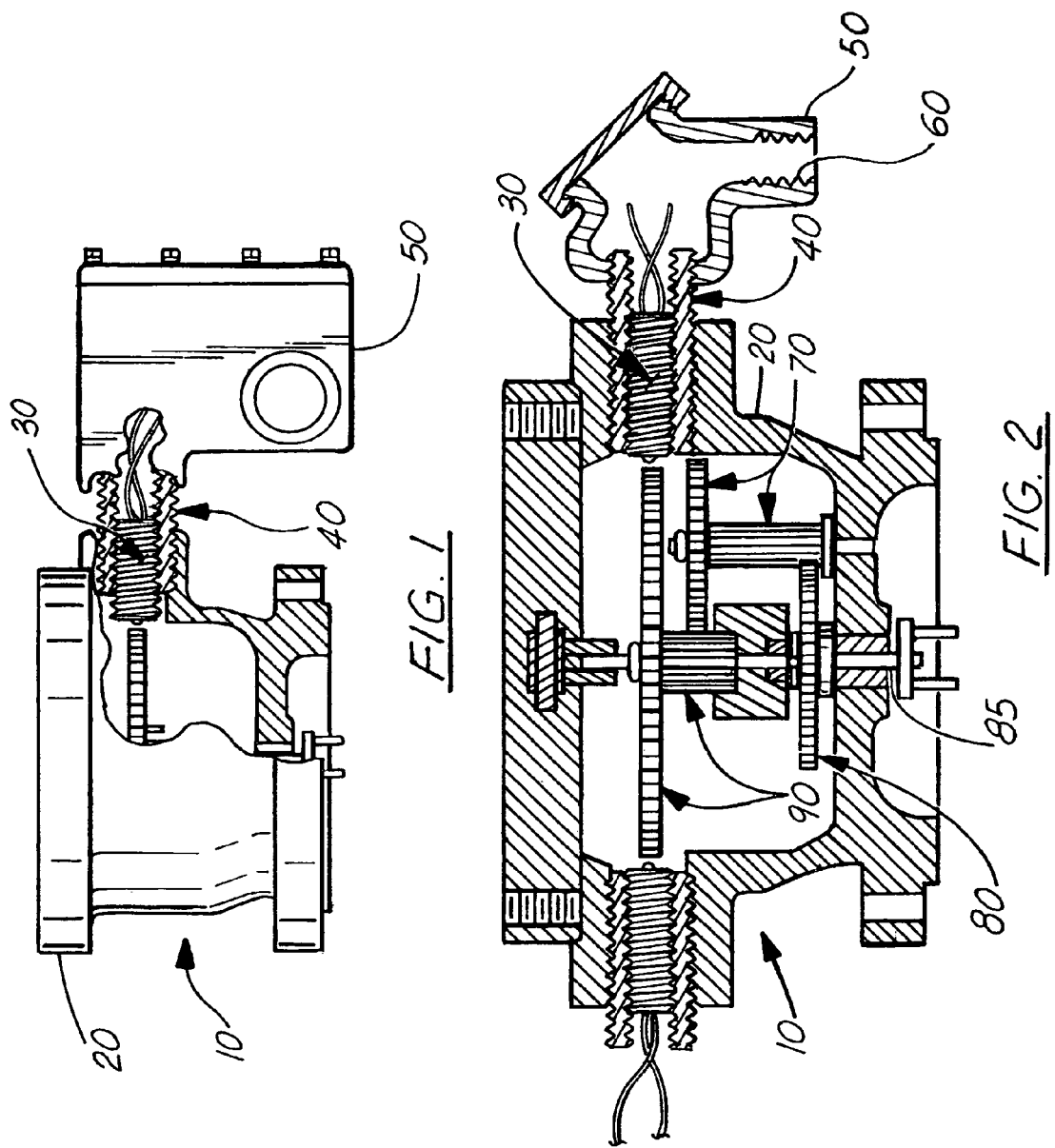

PULSE TRANSMITTER

CROSS-REFERENCE TO RELATED APPLICATIONS

Priority of my U.S. Provisional Patent Application Ser. No. 60/382,994, filed 24 May 2002, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to transmitters. More particularly, the present invention relates to pulse transmitters.

2. General Background of the Invention

Historically, manufacturers of equipment see the need for equipment and decide how they will manufacture it. Orientation, accessories, equipment and operational usage is determined in a research and development facility. Very often this approach may work, but may not be exactly what is best for the job.

Attached to my U.S. Provisional Patent Application Ser. No. 60/382,994, filed 24 May 2002, were 7 pages showing an FMC Smith Meter (formerly A.O. Smith Meter). The original A.O. Smith Meter design was for an offset gear train and only one pick-off coil, followed by another unit with an offset gear train and two pick off coils.

Variable reluctance sensors and Hall-effect sensors are two types of proximity sensors. The variable reluctance sensors are typically used to sense a toothed metallic wheel for sensing rotary position or speed. Hall-effect sensors detect a change in a polarity of a magnetic field. Thus, the target must be a magnetic material. Hall-effect sensors are sensitive to a gap between the target and the sensor.

The following U.S. Patents are incorporated herein by reference:

U.S. Pat. No. 6,392,370 for Device and method of a back EMF permanent electromagnetic motor generator;
U.S. Pat. No. 5,956,626 for Wireless communication device having an electromagnetic wave proximity sensor.

BRIEF SUMMARY OF THE INVENTION

The apparatus of the present invention is a transmitter, similar to the A.O. Smith meter described in the papers attached hereto, but with concentric gearing. That is, the exciter gear is concentric with the main shaft in the center. Because of this concentricity, one can put practically any number of additional coils (typically four) to get four or more outputs. Also, each coil could be dual output to get eight outputs from four coils. Each coil, in conjunction with the concentric gear train, typically produces 1000 pulses per revolution of the main shaft.

The present invention, because of its compactness and light weight, has a more practical application in the liquid metering industry.

Other than the differences described herein, the present invention is like and can work in all respects like the A.O. Smith meter transmitter described in the papers attached to my U.S. Provisional Patent Application Ser. No. 60/382,994, filed 24 May 2002, and can be used in the same applications for the same purposes. The pulse transmitter of the present invention can be used in systems in which the information transmitted thereby is sent via wireless transmission from an offshore oil rig or via the internet from a land-located pipeline, for example.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a partially perspective, partially cut-away view of the preferred embodiment of the apparatus of the present invention; and FIG. 2 is a cut-away view of the preferred embodiment of the apparatus of the present invention.

DETAILED DESCRIPTION OF THE INVENTION

The apparatus 10 of the present invention serves a useful purpose in the liquid measurement industry. The apparatus 10 is simple and easy to use. The present inventor believe that the apparatus of the present invention, if widely adopted, will have a positive impact on the efficiency of the field technician.

The apparatus of the present invention will reduce maintenance, improve accuracy, extend the usable life of equipment and/or assist technicians with being more efficient.

The present inventor believe that the apparatus 10 of the present invention, if widely adopted, will have a practical impact on technicians, work load and equipment efficiency.

The apparatus 10 of the present invention is marketed as a Model CT-1000 Practical Transmitter. A similar invention (with a reluctance pickup) is marketed as a Model P1000 Practical Transmitter. The Model P1000 Practical Transmitter and the Model CT-1000 Practical Transmitter, currently commercially available from Lake Charles Instruments, Inc., are hereby incorporated herein by reference.

The concentric transmitter 10 is a high frequency pulse transmitter. The output signal is either sinusoidal from a reluctance type coil 30 or is a square wave signal from a Hall-effect coil 30. The transmitter output is preferably designed to produce 1000 pulses per revolution of the main drive shaft 85. The transmitter main drive shaft 85, located in the center of the transmitter 10, turns a special gear train that eventually turns a 100 tooth exciter gear 90. The exciter gear 90 is located concentric with the transmitter body and main drive shaft 85: There are two reasons for this orientation:

1.) By eliminating an offset gear train, the durability is increased.
2.) Without a custom external electrical enclosure built onto one side of the transmitter 10, as many as four independent transmitter outputs may easily be integrated into the transmitter.

This is of interest to the end-user of the transmitter 10. Instead of sharing a common signal to monitor the amount of flow through the meter, each company wants its own independent signal. This signal is preferably completely isolated electrically from other electrical equipment.

There are two common types of transmitter coils 30 available for this particular transmitter 10. A reluctance coil that requires no power to the unit and Hall-effect coil that requires usually 12 VDC or 24 VDC. Reluctance coils are more susceptible to A.C. signal noise in the wiring and usually require an external amplifier to convert the signal to a square wave output. Square wave outputs (such as those produced by a Hall-effect coil) are more compatible with flow computers and digital electronic devices.

The output signal generated by the transmitter 10 is preferably directly proportional to flow through the meter. Therefore, it can be used for proving (calibration) of the meter it is mounted on or for line control (SCADA systems) at the same time from the additional coils 30. Since there are more than one independent pick off coil available, each operating coil 30 is independent (electrically) of the other coil 30.

A typical application for this kind of transmitter 10 is on a meter located on an offshore production platform. The primary purpose of the meter is to measure (for purposes of selling) the crude oil production pumped to the pipeline that eventually reaches inland pipeline systems. The pipeline system can be located underwater on the floor of the Gulf of Mexico (for example). In addition to measuring the amount of oil accurately for generated earnings, the meter also sends a continuous signal to pipeline control centers that monitor the pipeline.

Control centers have responsibility for operation, mismeasurement, and line integrity. Because of the liability involved in their job, a reliable transmitter proportional to flow is essential. Examples of the most common locations of control centers in the USA are New Orleans, Houston, and Chicago. However, numerous control centers are located around the world.

Flow rates are directly proportional to transmitter speed and when the flow rate indicated drops to zero and the main pump is running, a leak in the Gulf of Mexico (for example) could be in process. Therefore, it is critical to be able to monitor the flow rate through the meter.

In addition to the example given of offshore platforms, there are numerous other applications in other areas, such as inland pipelines, oil production leases, refineries, chemical plants, barge and ship docks, etc.

Transmitter Gear Calculations $$\frac{\text{Driver}}{\text{Driven}} - 60T \times \frac{60T}{20T} \times \frac{100T}{18T} = \frac{360,000}{360} = 1000$$

Thus, 1000 teeth of the 100-tooth gear 90 cross the center of the pick up coil (transducer) 30 every time the main shaft makes one revolution.

Each time the tooth crosses the core of the pick off coil 30, voltage output increases to approximately 10 volts or more, then drops to around 0 volts after tooth tip leaves sensor. This translates to a square wave output.

The CT-1000 will work with most any type gear sensor, (Reluctance coil, Hall-effect Switch, etc.) designed to count teeth on gears. It can be used for metering, speed indication, etc. The thing that sets it apart from any prior designs is that:

A.) The exciter gear 90 that the sensor 30 is counting teeth on is concentric with the main external housing 20;

B.) Because of this exciter gear 90 being concentric with the transmitter main housing 20, it can have any number of coils 30 located so that it can count the teeth accurately as the main shaft gear 80 turns the idler gear 70, that in turn, turns the exciter gear 90. No additional gears are required in the gear train. However, a different gear train may be required for special meter applications, but would not change the overall advantage of the concentric transmitter 10. Special non-standard gears are "special" cut so that the diametrical pitch requires only one idler gear. This reduces the amount of wear. Also, the gears are thicker than normal transmitter gears. This makes them more rugged, longer lasting, and less susceptible to vibration. Additionally the driver gears are larger than the driven gears. So, the driven gears are made of 304 stainless steel. Normally the smaller driven gear wears before the driver gear due to friction. By making a driven gear out of 304 stainless steel the life of the driven gear is substantially longer. However, material would not discount the intent of the invention.

C.) The positioning of the sensor 30 is such that it doesn't need to be adjusted for maximum output when manufactured, it is positioned so that it bottoms out on the sensor housing post 40. This housing post 40 is made of aluminum so that it is inert with respect to the sensing of the coil 30. The post 40 is internally threaded through the center of the post 40. The dimension from the outside edge face of the post 40 to the tip of the gear teeth on the exciter gear 90 is machined for a standard length. Thus, there is no need for time-consuming adjustments, when the coil (sensor) 30 is changed or initially put into operation.

D.) When used with a solid state sensor (Hall-effect type, etc.) no amplifier is needed. A direct square wave or staggered output pulse from 0 volts to in excess of +10 volts is obtained without any adjustment or amplifier. In addition the sensor can be used in zero speed sensing. This means that when the exciter gear 90 is barely turning you will still generate a full voltage out of around 0 volts to in excess of +10 volts.

E.) By using more than one coil (typically 3), a substantial money savings is realized. With the 3 coil unit, you are replacing 3 individual transmitters, which would create more drag on the meter, more parts to wear and require maintenance and more torque load on the meter, reducing accuracy.

F.) By the positioning the sensor 30 so that it doesn't need to be adjusted, a sensor can be changed without removing the unit 10 off the meter. This is an additional savings of time and money.

The coils could be classified explosion proof, or intrinsically safe.

Sensor housing post 40 is received in J-box 50. J-box 50 includes an opening 60 with, for example, 1" conduit thread.

PARTS LIST

The following is a list of parts and materials suitable for use in the present invention:

10 pulse transmitter of the preferred embodiment of the present invention
20 transmitter body (such as aluminum, cast iron, or stainless steel)
30 pickup (Hall-effect (preferred) or reluctance type with pre-amplifier))

40 inside threaded nipple with, for example, 1" thread for connection box
50 J-box
60 opening in J-box with, for example, 1" conduit thread
70 double idler gear rotating on, for example, ¼" S.S. shaft with two bearings, one on top and one on bottom of gear (60 teeth on top gear, 20 teeth on bottom gear); top gear can be carbon steel and bottom gear stainless steel, for example
80 main drive gear (60 teeth) locked to, for example, ¼" S.S. main drive shaft 85
85 main drive shaft
90 double exciter gear (100 teeth on top gear, 18 teeth on bottom gear) rotating around, e.g., ¼" S.S. main drive shaft; top gear can be carbon steel and bottom gear stainless steel, for example All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. Apparatus for monitoring fluid transmission comprising:
    a transmitter for fluid metering, the transmitter including concentric gearing, including a main shaft in the center and an exciter gear concentric with the main shaft in the center;
    means for attaching the transmitter to a meter which measures liquid flow;
    a plurality of coils for producing outputs indicative of the amount of fluid flowing through the meter; and
    means for transmitting the output from the fluid metering location to a second location, wherein each coil produces 1000 pulses per revolution of the main shaft.

2. The apparatus of claim 1, wherein there are at least three coils.

3. The apparatus of claim 2, wherein each coil produces two outputs.

4. The apparatus of claim 2, wherein the second location is remote from the fluid metering location.

5. A method of monitoring fluid transmission comprising:
    using the apparatus of claim 2 to monitor fluid transmission.

6. The apparatus of claim 3, wherein the second location is remote from the fluid metering location.

7. The apparatus of claim 1, wherein each coil produces two outputs.

8. The apparatus of claim 7, wherein the second location is remote from the fluid metering location.

9. A method of monitoring fluid transmission comprising:
    using the apparatus of claim 7 to monitor fluid transmission.

10. A method of monitoring fluid transmission comprising:
    using the apparatus of claim 1 to monitor fluid transmission.

11. Apparatus for monitoring fluid transmission comprising:
    a transmitter for fluid metering, the transmitter including concentric gearing, including a main shaft in the center and an exciter gear concentric with the main shaft in the center;
    a plurality of coils for producing outputs indicative of the amount of fluid flowing through a pipeline;
    means for transmitting the output from the fluid metering location to a second location, wherein each coil produces 1000 pulses per revolution of the main shaft.

12. The apparatus of claim 11, wherein the second location is remote from the fluid metering location.

13. A method of monitoring fluid transmission comprising:
    using the apparatus of claim 11 to monitor fluid transmission.

14. Apparatus for monitoring fluid transmission comprising:
    a transmitter for fluid metering, the transmitter including concentric gearing, including a main shaft in the center and an exciter gear concentric with the main shaft in the center;
    a plurality of coils for producing outputs indicative of the amount of fluid flowing through a pipeline; and
    means for transmitting the output from the fluid metering location to a second location, wherein the second location is remote from the fluid metering location, wherein each coil produces 1000 pulses per revolution of the main shaft.

15. A method of monitoring fluid transmission comprising:
    using the apparatus of claim 14 to monitor fluid transmission.

\* \* \* \* \*